Figure 1:
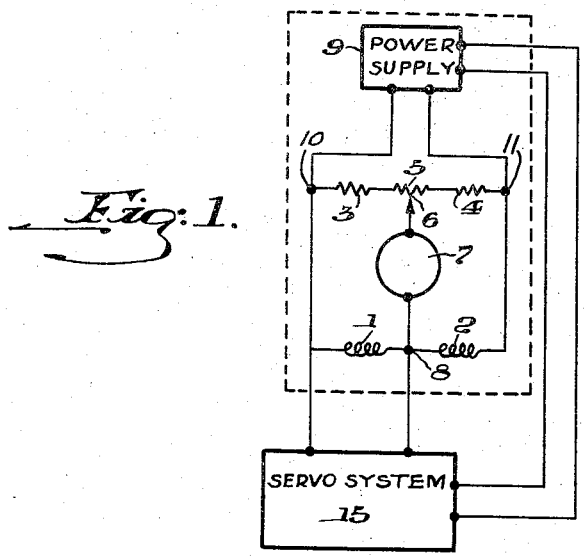

March 24, 1959     C. I. JONES ET AL     2,879,142
COMBUSTIBLE GAS DETECTOR
Filed Sept. 21, 1955

INVENTORS
CLARENCE I. JONES
ROBERT A. MORRIS
BY
Brown, Critchlow, Flick & Peckham
ATTORNEYS.

United States Patent Office 2,879,142
Patented Mar. 24, 1959

2,879,142

COMBUSTIBLE GAS DETECTOR

Clarence I. Jones and Robert A. Morris, Pittsburgh, Pa., assignors to Mine Safety Appliances Company, Pittsburgh, Pa., a corporation of Pennsylvania Application September 21, 1955, Serial No. 535,602

5 Claims. (Cl. 23—255)

This invention relates to the testing of gases to ascertain either the presence or the amount, or both, of the combusible constituents thereof by passing the gas in contact with an electrically heated filament, which causes any combustible constituents that are present to burn, and which is associated with means that are electrically responsive to the resulting heat of combustion on the surface of the filament.

Conventional detecting and measuring apparatus of the foregoing type generally includes a detector filament that has been treated to give it catalytic oxidizing properties, which is heated electrically to a temperature that will assure combustion at the filament surface of any flammable constituents present in the gas to be tested. The filament is included in a Wheatstone bridge circuit, which is balanced in the absence of combustible gas, and becomes unbalanced when the filament resistance is increased by the heat of combustion due to the presence of a flammable gas. When such a filament is exposed to a gas having a high concentration of combustible constituents, its temperature rise can be very great; and, if such exposure continues for any length of time, the life of the filament is radically shortened, due to the evaporation of metal therefrom at a rate that is a function of the filament temperature. Accordingly, if the detector filament could be operated constantly at a temperature just high enough to cause complete catalytic oxidation of the combustible constituents of the gas being tested, and not have its temperature increased by the oxidation of those constituents, its lift would be measurably prolonged.

It has heretofore been proposed to maintain the detector filament at such a constant temperature by varying the electrical current to the bridge circuit so as to keep the bridge in balance in the presence, as well as in the absence, of a combustible gas, on the theory that the heat supplied to the filament by gas combustion is exactly compensated for by a reduction in the heat supplied to the filament by the electric current. The required change in the current supply to keep the bridge in balance is used as the measure of combustible gas concentration. Such proposed circuits have inherent disadvantages. In the first place, the change in the electrical current, which serves as the measure of combustible gas present, is applied to two dissimilar elements in one branch of the bridge circuit, viz., a heated detector filament and an unheated fixed resistance. There is accordingly a non-linear relation between the current to the bridge and the percentage of combustible constituents in the gas being tested. Secondly, circuits of the type just described are substantially constant voltage circuits in which variations of current, rather than variations in total electrical power, are measured. This results in a further non-linear response of such apparatus. A third, and perhaps more important, disadvantage is that this single filament bridge circuit cannot discriminate between changes in combustible concentration and other changes in ambient conditions that likewise affect the temperature of the detector filament. Such conditions include variations in atmospheric pressure (gas density) and temperature, and variations in the rate of flow of the gas over the detector filament. All of those ambient conditions, as well as variations in the voltage supply, affect the temperature, and hence the resistance, of the detector filament and tend to unbalance the bridge circuit. In the conventional apparatus that has been referred to, this unbalance causes the power to the bridge to be changed, and the change is erroneously recorded as a variation in the concentration of combustible constituents in the tested gas.

It is accordingly among the objects of this invention to provide an apparatus for detecting the presence and quantity of combustible gas in a gaseous mixture by means of a heated filament in association with electrical indicating means, in which the filament will be automatically maintained at a predetermined temperature, both when a combustible gas is and is not in contact with it, thereby prolonging the life of the filament; in which there will be a substantially linear relation between the response of the indicating means and the combustible content of the gas being tested; and in which changes in ambient conditions, such as in atmospheric pressure or temperature, or in the rate of flow of the gas to be tested, or in variations of the voltage supply, will not affect either the calibration of the instrument or its indicated readings.

Other objects will appear from the following specification, in which the invention is described in connection with the attached drawings.

Figure 2:
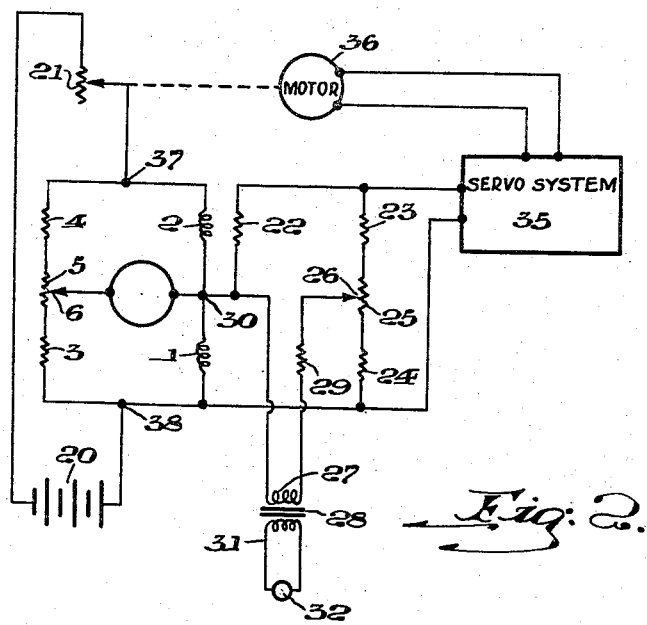

In those drawings:

Fig. 1 represents a schematic electrical circuit embodying the present invention; and Fig. 2 represents a similar circuit illustrating a modified form of the invention.

This invention is predicated on the use of both a detector and a compensator filament that are substantially identical, except that the detector filament is catalytically treated to promote the combustion of gas on its surface, while the compensator filament is not so treated and may be additionally treated to inhibit such combustion. These two filaments are connected in series in one branch of a Wheatstone bridge circuit, which also includes fixed resistances in the other branch and a galvanometer across the bridge, in accordance with conventional practice. A source of electrical power is connected to the bridge and means are provided for balancing the bridge circuit in the absence of a combustible gas. Across the detector filament is connected a servo system that is responsive to changes in the resistance of that filament. The servo system is also connected to and controls the electrical power supply, and varies it to compensate for any change in the resistance of the detector, so as to maintain that resistance at a constant value. In the presence of a combustible gas, the servo system decreases the power input to the bridge, so that the heating of the detector filament by electric current is reduced to the same extent that heat is supplied to that filament by the oxidation of gas on its surface. The detector filament accordingly remains at its initial temperature, but the compensator filament's temperature is lowered by the reduction of the power supply without any compensating rise from gas combustion. The two filaments, initially at the same temperature, are now at different temperatures, and the resulting unbalance of the bridge, as indicated by the galvanometer, is a measure of the concentration of the combustible gas that is present.

Referring to Fig. 1, there is shown a Wheatstone bridge circuit including a detector filament 1, which may be of platinum that has been treated to give it catalytic oxidizing properties. This filament is connected in series with a substantially identical compensator filament 2, except that the latter is without catalytic oxidizing properties and may be treated to further inhibit the combustion of gas on its surface. These two filaments constitute one branch of the bridge circuit, and both are adapted to be brought into contact in the usual way with a sample of the gas to be tested. The other branch includes fixed resistances 3 and 4 connected in series. A third resistance 5 between resistances 3 and 4 is provided with a sliding contact 6 connected to one terminal of a galvanometer 7, the other terminal of which is connected to the first branch of the bridge at a point 8 between the detector and compensator filaments. A source of variable electric power 9 is connected to the bridge circuit at points 10 and 11. Resistance 5, with its slider 6, provides a means for initially balancing the bridge circuit in the absence of a combustible gas.

Across the detector filament 1 is connected a servo system 15, which is shown diagrammatically and may consist of any one of a number of available conventional systems, either entirely electronic or a combination of electronic and mechanical means. The servo system is also connected to the power supply 9 (which may be either A.C. or D.C.) and is adapted to vary the power supply to the bridge in response to changes in the resistance of the detector filament 1 within desired limits of sensitivity. In other words, as a combustible gas is simultaneously brought into contact with the detector and compensator filaments, it will burn on the surface of the former filament but not on the surface of the latter. The heat of its combustion will tend to raise the temperature of the detector filament and increase its electrical resistance. That increase in resistance acts as a signal to the servo system, which in turn decreases the electrical power to the bridge circuit to the point where the resistance (and therefore the temperature) of the detector filament is the same as before. At the same time, the power supply to the compensator filament is also decreased and its temperature, which was formerly the same as that of the detector filament in the absence of a combustible gas, is now decreased, resulting in unbalance of the bridge circuit as measured by the deflection of the galvanometer 7. The bridge becomes unbalanced to the same extent, regardless of the concentration of the combustible constituents, that it would have if the compensator filament had remained at its initial value and the temperature of the detector filament had been allowed to increase without limitation from the heat generated by the oxidation of the combustible constituents.

A modified form of this invention is shown schematically in Fig. 2, in which the same elements as those in Fig. 1 are similarly numbered. Here the power supply to the previous bridge circuit is provided by a source of direct current 20, controlled by a rheostat 21. The detector element 1 is additionally connected in an alternating current bridge circuit, which includes a fixed resistance 24 in the same branch as the detector filament 1, and fixed resistances 22 and 23 in the other branch. A resistance 25 is interposed between resistances 23 and 24, and is provided with a sliding contact 26. The A.-C. bridge is balanced by moving the sliding contact 26. The sliding contact 26 is connected to one side of the secondary 27 of a transformer 28, through a resistance 29. The other side of the transformer secondary is connected to the point 30 between the branches of the alternating current bridge. The primary 31 of the transformer is energized by an alternating current source 32. A servo system 35, including an electric motor 36, is connected across the A.-C. bridge between resistances 22 and 23 on the one side and resistance 24 and filament 1 on the other side, so that the servo system and resistance 22 are connected across filament 1 at points 30 and 38. The motor 36 controls the rheostat 21, so that the servo system regulates the power input to the direct current bridge at points 37 and 38. The balance point of the A.-C. bridge, by controlling the null position of the servo system, determines the initial power supplied to the D.-C. bridge and establishes the filament operating temperature.

The apparatus of Fig. 2 operates in a manner similar to that of Fig. 1. The direct current bridge is initially balanced with both filaments heated in the absence of a combustible gas. When a combustible gas is later brought into contact with those filaments, the detector filament 1 again tends to rise in temperature and this tends to unbalance the A.C. bridge, transmitting a signal to the electronic-mechanical servo system which varies the power supply to the D.C. bridge to the extent necessary to restore the resistance of detector filament to its original value. At the same time, the resistance of the compensator filament 2 is reduced and the D.C. bridge becomes unbalanced, so that the amount of combustible constituent in the gas being tested will be indicated by the galvanometer 7, as before.

It will be apparent that this invention has all the advantages inherent in the use of detector and compensator filaments, without the disadvantages of conventional apparatus of this type. The two filaments can be identical in their electrical properties and subjected to the same ambient conditions, and the electrical power to those filaments can be varied simultaneously, so that in the absence of a combustible gas the bridge circuit will remain balanced, regardless of changes in pressure (gas density), temperature, humidity, etc. The presence of a combustible gas, and variations in its concentration, will alone cause unbalance of the bridge circuit. Most importantly, this invention permits filament life to be greatly prolonged, even when the intrument is used continuously in gases having a high concentration of combustible constituents. Under such conditions the detector filament will have as long a life as will the detector filament of conventional apparatus when operated continuously at the same temperature in pure air above.

An important use of this invention is in detecting and measuring the concentration of combustible gas at widely varying altitudes, for example, in aircraft. Here, the superiority of this invention over conventional apparatus is most marked. With conventional apparatus, the filament operates at a much higher temperature at higher altitudes, because the resulting decrease in thermal conductivity of the atmosphere results in less heat being conducted away from the filament. This shortens the filament life. It also decreases the sensitivity of the apparatus, because the percentage increase in filament temperature due to the combustion of gas is less when the initial temperature of the filament is increased. However, with the apparatus of this invention, the detector filament, in the absence of combustible gas, automatically remains at the same temperature at high altitudes as at sea level. The same is true of the compensator filament, so the bridge remains balanced and need not be recalibrated.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. Combustible gas testing apparatus comprising a detector filament and a substantially identical compensator filament, each adapted to be brought into contact simultaneously with a sample of the gas to be tested, but the detector filament alone being adapted to cause oxidation of combustible constituents therein, a Wheatstone bridge circuit including in one branch the detector and compensator filaments connected in series and in the other branch fixed resistances connected in series, a single source of electric power connected to the bridge circuit, servo means connected across the detector filament and responsive to changes in the resistance of that filament, the servo means being also connected to said power source and adapted to vary the power input to the bridge circuit to maintain the resistance of the detector filament at a predetermined value.

2. Combustible gas testing apparatus comprising a detector filament adapted to be brought into contact with a gas to be tested and to cause oxidation of combustible constituents therein, a compensator filament having substantially the same resistance as the detector filament when both filaments are electrically heated in pure air, a Wheatstone bridge circuit including the detector and compensator filaments in series in one branch of the circuit and fixed resistances in series in the other branch, a single source of variable electric power connected to the bridge circuit for heating both filaments to a predetermined temperature, means for balancing the bridge circuit in the absence of combustible gas, a galvanometer connected across the bridge, and servo means connected across the detector filament and adapted to vary the electrical power to both filaments in response to changes in the resistance of the detector filament, thereby to maintain that filament at its predetermined temperature both in the presence and in the absence of combustible constituents.

3. Combustible gas testing apparatus comprising a detector filament and a substantially identical compensator filament, each filament being adapted to be brought into contact simultaneously with a sample of gas to be tested when both filaments are heated to a predetermined temperature but the detector filament alone being adapted to cause oxidation of combustible constituents therein, a Wheatstone bridge circuit including in one branch the detector and compensator filaments connected in series, a source of direct current connected across said branch, a galvanometer connected across the bridge, a fixed resistance connected in series with the detector filament to form one branch of a second Wheatstone bridge circuit, a source of alternating current connected across said branch of the second bridge circuit, a different source of electric power connected to each bridge circuit, means for balancing each bridge circuit in the absence of combustible gas, and servo means connected across the second bridge circuit and responsive to unbalance in that circuit caused by changes in the resistance of the detector filament due to the presence of a combustible gas, the servo means being adapted to vary the power supply to the first bridge circuit but not to the second bridge circuit to maintain the resistance of the detector filament at a predetermined value.

4. Combustible gas testing apparatus according to claim 3, in which the servo means includes a rheostat in series with the power supply to the first bridge circuit and an electric motor connected to and controlling the rheostat and means responsive to unbalance in the second bridge circuit for operating the motor.

5. Combustible gas testing apparatus comprising a detector filament and a compensator filament, the filaments being substantially identical and adapted to be heated electrically and brought simultaneously into contact with a gas to be tested, the detector filament alone being adapted to oxidize combustible constituents in said gas, a first Wheatstone bridge circuit including both filaments in series in one branch of the circuit and fixed resistances in series in the other branch, a second Wheatstone bridge circuit including the detector filament and a fixed resistance in series in one branch of its circuit and fixed resistances in series in the other branch, a source of direct current connected to the first bridge, a source of alternating current connected to the second bridge, means for balancing each bridge in the absence of combustible constituents, whereby both filaments will be at substantially the same temperature, servo means connected across the second bridge and responsive to any unbalance therein, the servo means being adapted to vary the voltage to the first bridge but not to the second bridge when the resistance of the detector filament tends to change from a predetermined value, whereby the temperature of the detector filament will be maintained constant both in the presence and in the absence of combustible constituents and regardless of changes in ambient conditions, and indicating means connected across the first bridge circuit for indicating and measuring the unbalance of that circuit in the presence of combustible constituents in contact with the detector filament.

References Cited in the file of this patent
UNITED STATES PATENTS

| | | |
|---|---|---|
| 2,053,121 | Vayda | Sept. 1, 1936 |
| 2,583,930 | Cotton | Jan. 29, 1952 |
| 2,759,354 | Cherry et al. | Aug. 21, 1956 |
| 2,782,102 | Howe | Feb. 19, 1957 |